United States Patent [19]
Hansen

[11] Patent Number: 5,940,312
[45] Date of Patent: Aug. 17, 1999

[54] SIGNED BINARY LOGARITHM SYSTEM

[75] Inventor: Craig C. Hansen, Los Altos, Calif.

[73] Assignee: Microunity Systems Engineering, Inc., Sunnyvale, Calif.

[21] Appl. No.: 08/728,802

[22] Filed: Oct. 10, 1996

Related U.S. Application Data

[60] Provisional application No. 60/005,235, Oct. 10, 1995.
[51] Int. Cl.$^6$ .................................. G06F 7/38; G06F 7/00
[52] U.S. Cl. .................................. 364/745.04; 364/715.08
[58] Field of Search ........................... 364/715.04, 715.1, 364/736.01, 736.02, 736.05, 748.01, 748.02, 748.03, 748.04, 748.11, 748.4, 748.16, 715.08, 745.03, 745.04, 736.5

[56] References Cited

U.S. PATENT DOCUMENTS

| | | | |
|---|---|---|---|
| 3,831,012 | 8/1974 | Tate et al. | 364/715.04 |
| 4,789,956 | 12/1988 | Hildebrandt | 364/736.5 |
| 4,825,400 | 4/1989 | Simoncic et al. | 364/748.11 |
| 5,216,628 | 6/1993 | Mizutani et al. | 364/715.012 |

*Primary Examiner*—Chuong Dinh Ngo
*Attorney, Agent, or Firm*—McDermott, Will & Emery

[57] ABSTRACT

A method and apparatus for implementing a binary logarithm of most significant bit instruction that operates on an input signed binary number. The input signed binary number includes a fixed number of successive bits with an input most significant bit and a plurality of input lower significant bits. The method individually performs an exclusive-or operation on each of the input lower significant bits with the input most significant bit. The method then inputs an output unsigned binary number to an execute unsigned logarithm of most significant bit instruction, wherein the output unsigned binary number includes a fixed number of successive bits with a zero as an output most significant bit and the result of each of the exclusive-or operations as successive output lower significant bits. The apparatus includes a plurality of two input exclusive-or gates, each with the input most significant bit connected as a first input and one of the input lower significant bits connected as a second input, and an output connected to an input of an execute unsigned logarithm of most significant bit instruction.

2 Claims, 4 Drawing Sheets

SIGNED BINARY LOGARITHM SYSTEM

This is a continuation of Provisional application Ser. No. 60/005,235, filed on Oct. 10, 1995, entitled EXTENDED POLYNOMIAL MATHEMATICS INSTRUCTIONS.

FIELD OF THE INVENTION

The present invention relates to the field of computation involving unsigned binary numbers and signed (two's complement) binary numbers in a digital processor.

BACKGROUND OF THE INVENTION

Binary values are the paramount representation used in digital computation. Common forms of representing values are unsigned binary numbers and signed (or two's complement) binary numbers.

Unsigned binary numbers represent integer values from zero to a value which depends on the size of the operand: $2^{size}-1$. Each of the bits, labelled from zero at the least-significant bit position to (size-1) at the most-significant bit position, in such a number indicates a weight which is $2^{position}$. The sum of each of the weights is the value of the unsigned binary number. It should be noted that the weight of the most significant bit is $2^{(size-1)}$.

Signed binary numbers represent integer values from $-2^{(size-1)}$ to $2^{(size-1)}-1$. The value of the left-most bit (size-1) in these operands indicates the sign of the operand: 1 indicates a negative value, and 0 indicates a positive or zero value. The weight of the sign bit can be considered to be $-2^{(size-1)}$. The remaining bits, labelled from zero at the least-significant bit position to (size-2) at the most-significant bit position, in such a number indicates a weight which is $2^{position}$. The sum of each of the weights is the value of the unsigned binary number.

Because unsigned and signed binary numbers differ only in the weight of the most-significant bit, certain operations, such as binary add or shift left, suffice for adding both signed and unsigned binary numbers. Other operations, such as shift right, are defined differently for unsigned and signed numbers.

Some binary computer systems include an instruction for returning the bit position of the first one (1), or most significant one (1) bit, of an unsigned binary number. Such an instruction has numerous uses, including normalizing unsigned binary numbers into a form where the most significant bit is shifted into a fixed location. Because the labelling of bits varies between computer systems, the definition of this instruction varies in turn. When the labelling of bits is in the little-endian bit order (where the least-significant bit of a binary number is labelled bit position zero and the most-significant bit is labelled bit position (size-1)), the result of such an instruction is not only the bit position, but also is the base-two logarithm of the most-significant one bit. A special condition results when the operand has a zero value (where no bits of any significance are set at all), in such a case it is appropriate to produce a value outside the normal range.

The existing binary computer systems, however, require three successive instructions for returning the bit position of the first one (1), or most significant one (1) bit, of a signed binary number. For example, in the case of 64-bit operands, an execute signed shift right immediate ("E.SHR.I 63") instruction followed by an execute exclusive-or ("E.XOR") instruction are required to modify the signed binary number prior to performing an execute unsigned logarithm of most significant bit ("E.ULMSe") instruction to compute the desired bit position. Such instructions are known to those of ordinary skill in the art. The E.SHR.I 63 instruction generates a word of all ones or all zeros, depending on the sign of the operand, the E.XOR instruction exclusive-or's the value, and then the E.ULMS instruction computes the position of the most significant zero (0) bit in the event that the operand was negative. This succession of dependent instructions, relative to the operation cycle time of a 64-bit add instruction, therefore, requires three instruction cycles. It is therefore an object of the present invention to provide an instruction for computing the binary logarithm of most significant bit of a signed binary number in a single instruction cycle time.

Additionally, an operation or computation is said to overflow if the result is outside the range of values which the size of the result of the computation can represent. For example, if the result of a binary add is eight bits, an unsigned add of values 127 and 129 would produce an overflow. Some binary computer systems include instructions which check for overflow on certain computations. For example, the Hewlett-Packard PA-RISC processor includes an instruction "ADD AND TRAP ON OVERFLOW" which adds two 32-bit binary numbers and traps if a signed overflow occurs.

Execute shift left immediate and check unsigned overflow ("E.SHL.I.UO") and execute shift left and check unsigned overflow ("E.SHL.UO") instructions provide for the shifting of a value by a fixed or variable amount, respectively, while checking that the value has not shifted out a significant bit or overflow. Such an occurrence usually indicates a loss of precision by overflow of the fixed size of the operand. This shifting corresponds to a scaling of the value or a multiplication by a power of two. Such instructions are known to those of ordinary skill in the art. It is therefore a further object of the present invention to extend the foregoing instructions to signed arithmetic, in which the values represented are from $-2^{(size-1)}$ to $2^{(size-1)}-1$.

SUMMARY OF THE INVENTION

A method and apparatus for an improved signed binary logarithm system is provided by the present invention. The system implements a binary logarithm of most significant bit instruction that operates on an input signed binary number. The input signed binary number comprises a fixed number of successive bits with an input most significant bit and a plurality of input lower significant bits. The method of the present invention individually performs an exclusive-or operation on each of the input lower significant bits with the input most significant bit. The method then inputs an output unsigned binary number to an execute unsigned logarithm of most significant bit instruction, wherein the output unsigned binary number comprises a fixed number of successive bits with a zero as an output most significant bit and the result of each of the exclusive-or operations as successive output lower significant bits.

The present invention also provides an apparatus for implementing a binary logarithm of most significant bit instruction that operates on an input signed binary number. The apparatus comprises a plurality of two input exclusive-or gates, each with the input most significant bit connected as a first input and one of the input lower significant bits connected as a second input. The output of each of the exclusive-or gates connects to an input of an execute unsigned logarithm of most significant bit instruction.

Additionally, the present invention provides an alternative method for implementing a binary logarithm of most significant bit instruction that operates on an input signed binary number. This alternative method individually performs an exclusive-or operation on each of the input lower significant bits with the next successively lower input significant bit. The method then inputs an output unsigned binary number to an execute unsigned logarithm of most significant bit instruction. The output unsigned binary number comprises a fixed number of successive bits with a zero as an output most significant bit and the result of each of the exclusive-or operations as successive output lower significant bits.

An apparatus for implementing the alternative binary logarithm of most significant bit instruction comprises a plurality of successive two input exclusive-or gates, each with one of the lower significant bits connected as a first input and the next successively lower significant bit connected as a second input. The output of each of the exclusive-or gates connects to an input of an execute unsigned logarithm of most significant bit instruction.

The present invention provides advantages over the prior art by providing a method and apparatus for executing an instruction for computing the binary logarithm of most significant bit of a signed binary number in a single instruction cycle time. Moreover, the present invention also provides a method and apparatus for executing shift left immediate and check unsigned overflow, and executing shift left and check unsigned overflow, instructions, while checking that the value has not shifted out a significant bit or overflow, on signed binary numbers.

DETAILED DESCRIPTION

Figure 1:
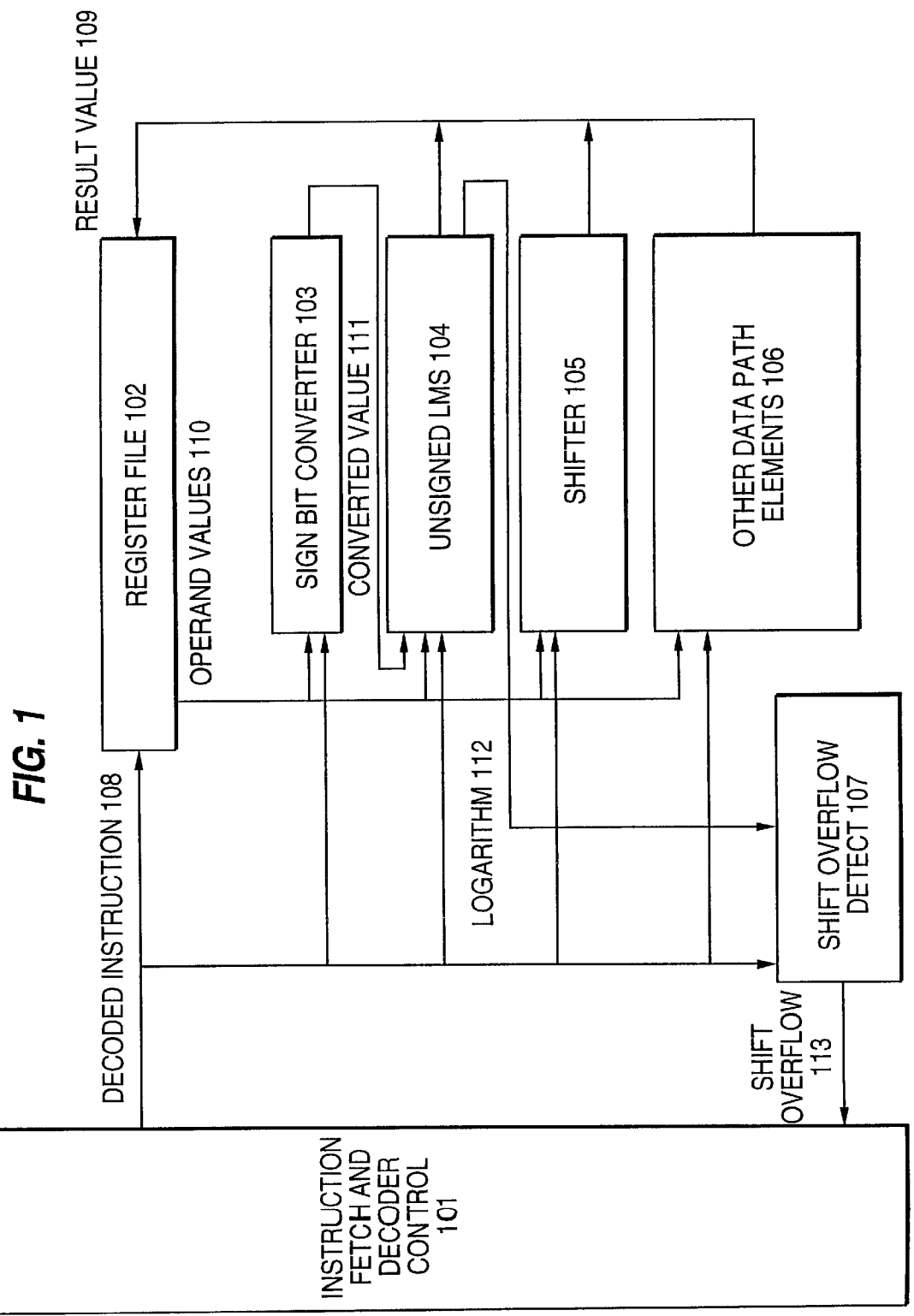
FIG. 1 illustrates a block diagram of a first embodiment of the signed binary logarithm system of the present invention.

A binary number processing system is described. In the following description, numerous specific details are set forth, such word size, address field size and bus widths etc., in order to provide a thorough understanding of the present invention. It will be obvious, however, to one skilled in the art that these specific details need not be employed to practice the present invention. In other instances, well-known system structures have not been described in detail in order to avoid unnecessarily obscuring the present invention.

System Overview

The following disclosure employs several operations which perform functions as expressed by the following pseudo-code:

Execute Operations:

| Operation codes | |
|---|---|
| E.ADD | Execute add |
| E.ADD.O | Execute add and check signed overflow |
| E.ADD.UO | Execute add and check unsigned overflow |
| E.AND | Execute and |
| E.ANDN | Execute and not |
| E.ASUM | Execute and summation of bits |
| E.LMS | Execute signed logarithm of most significant bit |
| E.NAND | Execute not and |
| E.NOR | Execute not or |
| E.OR | Execute or |
| E.ORN | Execute or not |
| E.ROTL | Execute rotate left |
| E.ROTR | Execute rotate right |
| E.SELECT.8 | Execute select bytes |
| E.SHL | Execute shift left |
| E.SHL.O | Execute shift left and check signed overflow |
| E.SHL.UO | Execute shift left and check unsigned overflow |
| E.SHR | Execute signed shift right |
| E.ULMS | Execute unsigned logarithm of most significant bit |
| E.USHR | Execute unsigned shift right |
| E.XNOR | Execute exclusive nor |
| E.XOR | Execute xor |

Format:

op rc = ra, rb

| 31 24 | 23 18 | 17 12 | 11 6 | 5 0 |
|---|---|---|---|---|
| E.MINOR | ra | rb | rc | op |
| 8 | 6 | 6 | 6 | 6 |

Description:

The operands in registers ra and rb are fetched and the specified operation is performed on these operands.

Definition:

```
def Execute(op,ra,rb,rc) as
    a ← RegRead(ra, 64)
    b ← RegRead(rb, 64)
    case op of
        E.ROTL:
            c ← a_(63-b_5.0)..0 ∥ a_63.(64-b_5.0)
        E.ROTR:
            c ← a_(b_5.0-1)..0 ∥ a_63..b_5.0
        E.SHL:
            c ← a_(63-b_5.0)..0 ∥ 0^b5.0
        E.SHL.O:
            if a_63.63-b_5.0 ≠ a_63^b5.0+ then
                raise FixedPointArithmetic
            endif
            c ← a_(63-b_5.0)..0 ∥ 0^b5.0
        E.SHL.UO:
            if a_63.64-b_5.0 ≠ 0 then
```

```
                    raise FixedPointArithmetic
            endif
            c ← a_{(63-b5..0)..0} ∥ 0^{b5..0}
    E.SHR:
            c ← a_{63}^{b5..0} ∥ a_{63..b5..0}
    E.USHR:
            c ← 0^{b5..0} ∥ a_{63..b5..0}
    E.ADD:
            c ← a + b
    E.ADD.O:
            t ← (a_{63} ∥ a) + (b_{63} ∥ b)
            if t_{64}_t_{63} then
                    raise FixedPointArithmetic
            endif
            c ← t_{63..0}
    E.ADD.UO:
            t ← (0^1 ∥ a) + (0^1 ∥ b)
            if t_{64}_0 then
                    raise FixedPointArithmetic
            endif
            c ← t_{63..0}
    E.AND:
            c ← a and b
    E.OR.:
            c ← a or b
    E.XOR:
            c ← a xor b:
    E.ANDN:
            c ← a and not b
    E.NAND:
            c ← not (a and b)
    E.NOR:
            c ← not (a or b)
    E.XNOR:
            c ← not (a xor b)
    E.ORN:
            c ← a or not b
    E.LMS:
            if (a=0) then
                    c ← -1
            else
                    for i ← 0 to 63
                            if a_{63..i} = (a_{63}^{63-i} ∥ not a_{63}) then
                                    c ← i
                            endif
                    endfor
            endif
    E.ULMS:
            if (a=0) then
                    c ← -1
            else
                    for i ← 0 to 63
                            if a_{63..i} = (0^{63-i} ∥ 1) then
                                    c ← i
                            endif
                    endfor
            endif
    E.ASUM:
            t ← a & b
            u ← (t_{63..1}&0x5555555555555555) + (t&0x5555555555555555)
            v ← (u_{63..2}&0x3333333333333333) + (u&0x3333333333333333)
            w ← (v_{63..4}&0x7070707070707070707) + (v&0x0707070707070707)
            x ← (w_{63..8}&0xf000f000f000f) + (w&0x000f000f000f000f)
            c ← x_{52..48} + x_{36..32} + x_{20..16} + x_{4..0}
    E.SELECT.8:
            for i ← 0 to 7
                    j ← b_{3*i+2..3*i}
                    c_{8*i+7..8*i} ← a_{8*j+7..8*j}
            endfor
endcase
RegWrite(rc, 64, c)
enddef
```

Execute Short Immediate operations:

| Operation codes | |
|---|---|
| E.ROTR.I | Execute rotate right immediate |
| E.SHL.I | Execute shift left immediate |
| E.SHL.I.O | Execute shift left immediate and check signed overflow |
| E.SHL.I.UO | Execute shift left immediate and check unsigned overflow |
| E.SHR.I | Execute signed shift right immediate |
| E.SHUFFLE.I | Execute shuffle immediate |
| E.USHR.I | Execute unsigned shift right immediate |

Format:

op rb = ra, simm

| 31 24 | 23 18 | 17 12 | 11 6 | 5 0 |
|---|---|---|---|---|
| E.MINOR | ra | rb | simm | op |
| 8 | 6 | 6 | 6 | 6 |

Description:

The operand in register ra is fetched and a 6-bit immediate operand is fetched from the 6-bit simm field. The specified operation is performed on these operands and the result is placed in register rb.

Definition:

```
def ExecuteShortImmediate(op,ra,rb,simm) as
    a ← RegRead(ra, 64)
    case op of
        E.SHUFFLE.I:
            case simm of
                0:
                    b ← a
                1..35:
                    for x ← 0 to 7; for y ← 0 to x−1; for z ← 1 to x−y
                        if simm = ((x*x*x−3*x*x−4*x)/6−(z*z−z)/2+x*z+y+1) then
                            for i ← 0 to 63
                                b_i ← a_(i7..x || iy+z−1..y || ix−1..y+z || iy−1..0)
                            end
                        endif
                    endfor; endfor; endfor
                36..255:
                    raise ReservedInstruction
            endcase
        E.ROTR.I:
            b ← a_simm−1..0 || a_63..simm
        E.SHL.I:
            b ← a_63−simm..0 || 0^simm
        E.SHL.I.O:
            if a_63..63−simm ≠ a_63^simm+ then
                raise FixedPointArithmetic
            endif
            b ← a_63−simm..0 || 0^simm
        E.SHL.I.UO:
            if a_63..64−simm ≠ 0 then
                raise FixedPointArithmetic
            endif
            b ← a_63−simm..0 || 0^simm
        E.SHR.I:
            b ← a_63^simm || a_63..simm
        E.USHR.I:
            b ← 0^simm || a_63..simm
    endcase
    RegWrite(rb, 64, b)
enddef
```

FIG. 1 illustrates a block diagram of a first embodiment of the signed binary logarithm system of the present invention. FIG. 1 shows instruction fetch and decoder control unit 101 coupled to register file 102, unsigned LMS (logarithm of most significant bit) 104, shifter 105, other data path elements 106 and shift overflow detect 107 via decoded instruction bus 108. The register file 102 is coupled via operand values buses 110 to signed bit converter 103, unsigned LMS 104, shifter 105, and other data path elements, and provides operands for each of the coupled units. The sign bit converter 103 is a central element of the present invention and is described in detail below. The sign bit converter 103 is coupled to the unsigned LMS unit 104 via converted value bus 111. The unsigned LMS unit 104 is coupled to the shift overflow detect unit 107 via logarithm bus 112. The unsigned LMS unit 104, shifter 105 and other data path elements 106 produce result values which are returned to the register file 102 via result value bus 109.

The present invention relates to the processing of unsigned binary values and signed (two's complement) binary values in a digital processor. Unsigned binary values represent numbers from zero to a value which depends on the size of the operand ($2^{size}-1$). The instructions described here are implemented as 64-bit operands, however, it should be understood that the size may vary without departing from the spirit and scope of the invention.

The instruction E.ULMS computes the position of the most significant bit that has the value one (1) in the source operand, using little-endian bit numbering, and returns that position. If none of the bits are one (1), the source operand is zero, and a negative one value (with all result bits set) is returned. This instruction is known in the art, and is sometimes described as a find first one ("FFO") instruction.

There are several uses for this instruction, one of which involves the normalization of fixed-point quantities into values in which the most-significant bit is in a known position by shifting the operand toward the left (toward the higher bit numbers). In such a case, the value computed by E.ULMS is subtracted from the desired bit position (e.g. with an E.SUB.I "position" instruction), and then the original operand is shifted (e.g. with an execute shift left ("E.SHL") instruction).

The first embodiment of the present invention extends the foregoing instructions to signed arithmetic, in which the values represented are from $-2^{(size-1)}$ to $2^{(size-1)}-1$. The value of bit 63 (size-1) in these operands indicates the sign of the operand (1 indicates a negative value, and 0 indicates a positive or zero value).

The first embodiment provides an E.LMS instruction which computes the position of the most significant bit of a signed binary value that is a one (1) when the sign is positive or zero (bit 63 is a zero), or a zero (0) when the sign is negative (bit 63 is a one). The E.LMS instruction executes the sequence of three instructions (E.SHR.I 63, E.XOR, and E.ULMS, as described in the "BACKGROUND OF THE INVENTION" section, above) in a single instruction cycle time, as discussed above. The cascading of the E.SHR.I 63 and E.XOR instructions carried out by the E.LMS instruction of the present invention occurs in a fraction of a single instruction cycle time, and thus leaves enough of the instruction cycle for executing the E.ULMS instruction. Therefore, for example, using the E.LMS instruction of the present invention, followed by E.SUB.I and E.SHL instructions, as described above, a signed binary value can be normalized in a significantly quicker period of time.

Figure 2:
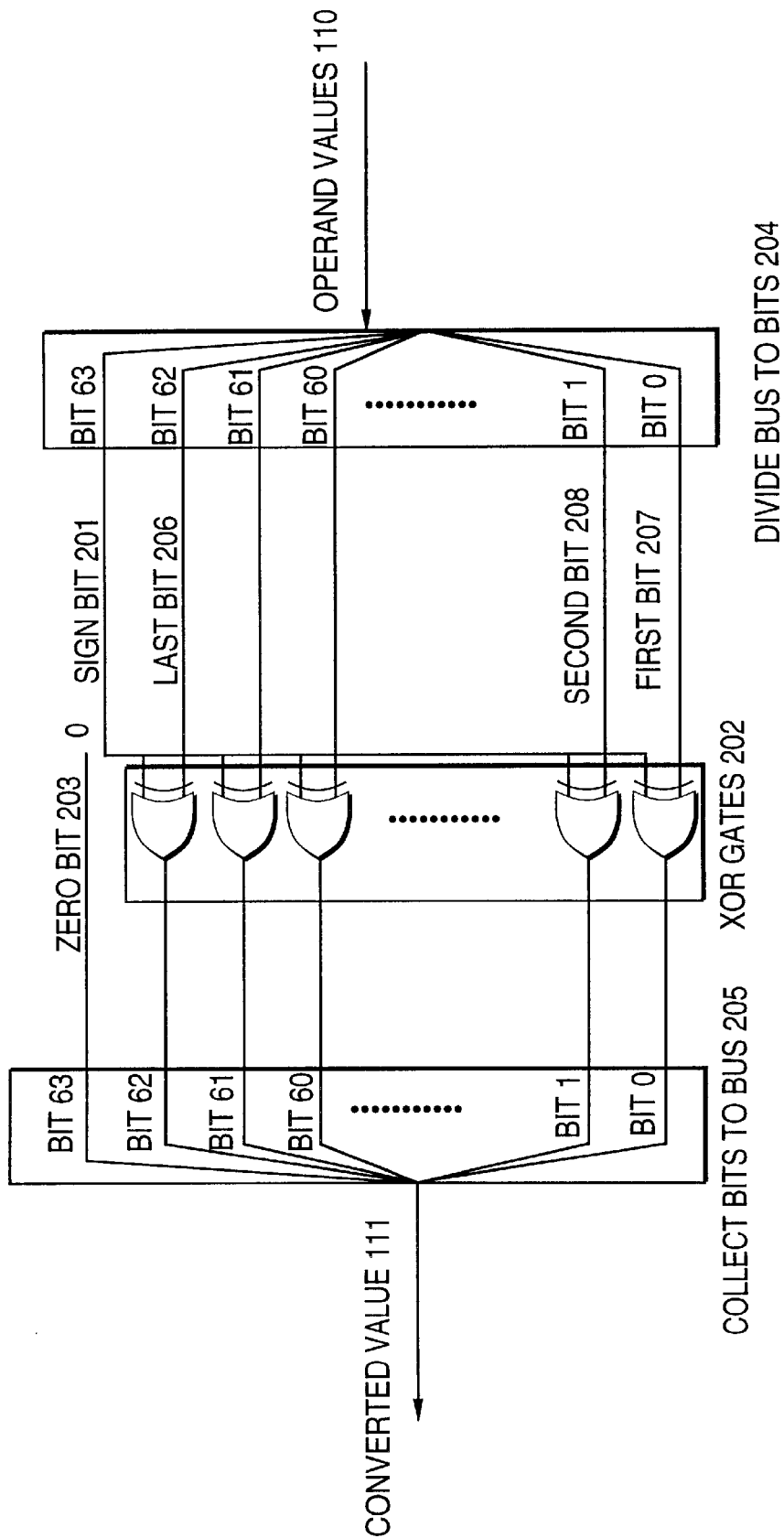
FIG. 2 illustrates a first circuit implementation of the Sign Bit Converter of FIG. 1.

The cascading of the E.SHR.I 63 and E.XOR instructions carried out by the E.LMS instruction of the present invention suggests a first hardware implementation as shown in FIG. 2. Operand value bus 110 is divided into individual bits by the divide bus to bits 204 (which contains no logic), producing 64 individual signals labeled bit 0 through bit 63. The first bit 207 is the least significant bit, or bit 0; the second bit 208 is bit 1; the last bit 206 is bit 62; and the sign bit 201 is bit 63. The sign bit 201 is coupled to a first input of each of 63 exclusive-or gates 202, which compute the exclusive-or of bit 63 with each of bits 62 through bit 0 of the operand value bus 110. These outputs are collected together, along with a single zero bit 203, by the collect bits to bus 205 (which contains no logic), producing the converted value 111.

The foregoing first hardware implementation, however, has the disadvantage that the sign bit must be driven across the entire data path (from bit 63 to bit 0), and thus necessitating a fan-out of 63. This is a general feature of the E.SHR.I instruction, but in this case it is desired to provide the sequence of three instructions (E.SHR.I 63, E.XOR, E.ULMS) in the same time as that of a single instruction. Therefore, the long path of the sign bit (bit 63) can limit performance.

A second hardware implementation of the cascading of the E.SHR.I 63 and E.XOR instructions carried out by the E.LMS instruction of the present invention, therefore, embodies an improvement in the performance of the configuration of the first hardware implementation, above. This second hardware implementation stems from the discovery that the E.LMS instruction can also be computed by E.SHR.I 1, E.XOR, E.ULMS. The E.SHR.I 1 instruction generates a value in which the bit in the position of the most significant bit has the value of the sign, and all higher bit positions also have the value of the sign. The remaining bit positions are less significant, both figuratively and literally. The E.XOR instruction then generates a value which has little mathematical meaning except that the leading one (1) bit is in the same position as previously computed with E.SHR.I 63 and E.XOR.

Figure 3:
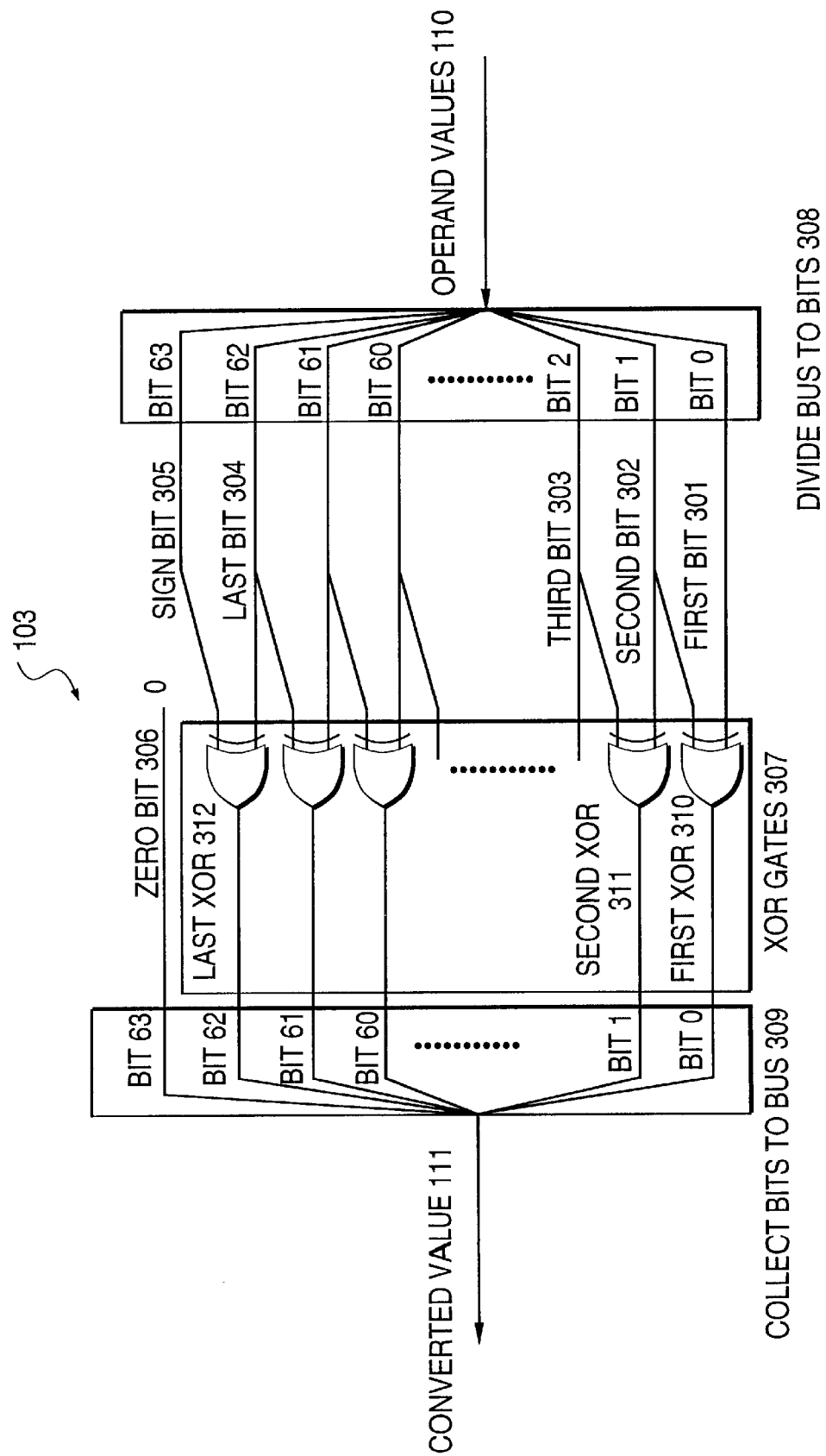
FIG. 3 illustrates a second circuit implementation of the Sign Bit Converter of FIG. 1.

This leads to an implementation of E.LMS in which the E.SHR.I 1 and E.XOR instructions optionally precede the E.ULMS instruction, and now the sign bit has but a single fan-out, as shown in FIG. 3. Operand value bus 110 is divided into individual bits by the divide bus to bits 308 (which contains no logic), producing 64 individual signals, labeled bit 0 through bit 63. The first bit 301 is the least significant bit, or bit 0; the second bit 302 is bit 1; the third bit 303 is bit 2; the last bit 304 is bit 62; and the sign bit 305 is bit 63. The sign bit 305 and the last bit 304 are coupled to inputs of the last exclusive-or gate 312 of the 63 exclusive-or gates 307, but each of the remaining exclusive-or gates 307 are coupled differently from FIG. 2. The inputs of the first exclusive-or 310 are coupled to the first bit 301 and second bit 302, and the inputs of the second exclusive-or 311 are coupled to the second bit 302 and third bit 303. The remaining exclusive-or gates are coupled in similar fashion, with one input coupled to the operand bit of the same bit position as the output bit position, and the second input coupled to the operand bit in a bit position one greater than the output bit position. These outputs are collected together, along with a single zero bit 306, by the collect bits to bus 309 (which contains no logic), producing the converted value 111.

As shown in FIG. 1, the unsigned LMS unit 104 computes the E.ULMS result from either operand values bus 110 or converted value 111, depending upon the decoded instruction 108. An implementation of the unsigned LMS unit 104 can contain a multiplexor to select one of these two possible input values. The instructions described above (E.SHR.I 1 and E.XOR) implemented in sign bit converter 103 can be combined with the multiplexor from unsigned LMS unit 104 into a logic block grouping which may be implemented in a single logic stage (and-or-invert). It is also notable that the E.SHL.UO/E.SHL.I.UO and E.SHL.O/E.SHL.I.O instructions may use the E.ULMS/E.LMS data path (sign bit converter 103 and unsigned LMS unit 104) to determine whether the E.SHL instruction causes the value to overflow. The overflow condition occurs when the sum of the E.ULMS result and shift amount is greater than 63 for E.SHL.UO and E.SHL.I.UO instructions and the sum of the E.LMS result and shift amount is greater or equal to 63 for E.SHL.O and E.SHL.I.O instructions. This computation can proceed in parallel, implemented in the shift overflow detect unit 107, coupled to unsigned LMS unit 104, coupled to sign bit converter unit 103, with the operation of the shifter unit 105 which computes the E.SHL result.

A second embodiment of the present invention achieves further improvements in performance of the sequence of instructions required to, for example, normalize a value (as described above) can be accomplished as a sequence of instructions, E.LMS/E.ULMS, E.SUB.I, and E.SHL, implemented by a further cascade of data path elements. In particular, a cascade of data path elements producing the E.LMS or E.ULMS values with an adder/subtractor which can be controlled as a single instruction leads to a further improvement in performance by reducing the number of instructions without an inordinate increase in instruction latency. This improvement is particularly useful and practical as the size of the E.LMS/E.ULMS result is much smaller than the operand width, so an adder/subtractor which modifies the result need only produce a six or seven bit result for a 64-bit operand. Thus, an additional data path element may be dedicated to this purpose at much lower cost than the use of the general adder/subtractor unit which is part of other data path elements 106. It can also be noted that the shift overflow detect unit 107 may be implemented with just such an adder/subtractor and can be shared for this purpose, further reducing implementation cost.

Figure 4:
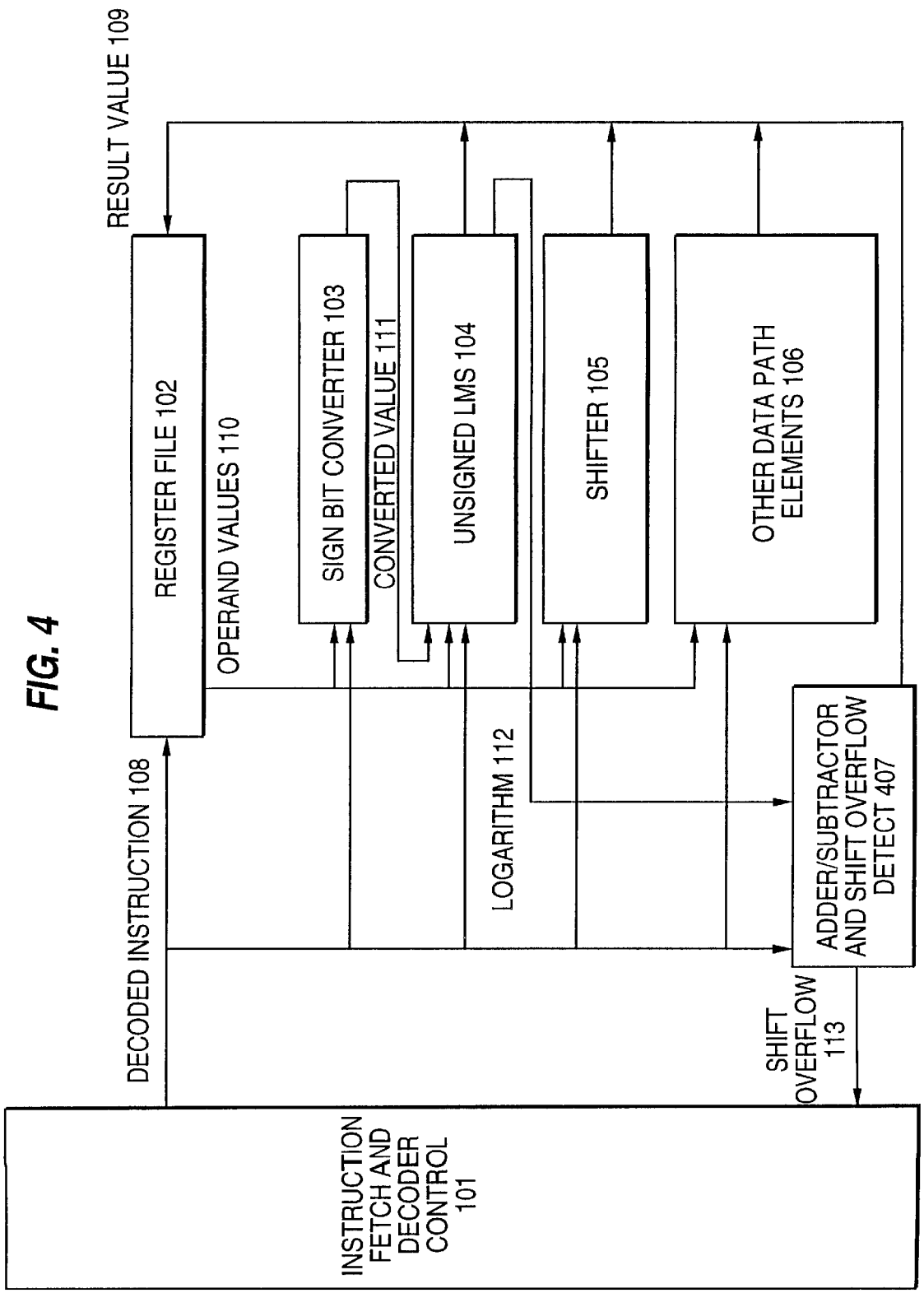
FIG. 4 illustrates a block diagram of a second embodiment of the signed binary logarithm system of the present invention.

FIG. 4 illustrates the system of the second embodiment, in which the result from an adder/subtractor within the adder/subtractor and shift overflow detect unit 407 may be coupled to the register file 102 via result value bus 109. This improved system is capable of executing single instructions E.LMS.SUB.I, E.ULMS.SUB.I, E.LMS.ADD.I, and E.LMS.SUB.I in a single flow of logic through the data path. Further, the logic blocks of the unsigned LMS 104 and the adder/subtractor and shift overflow detect 407 may be combined together for additional logic level optimization.

Although the elements of the present invention have been described in conjunction with certain embodiments, it is appreciated that the invention may be implemented in a variety of other ways. Consequently, it is to be understood that the particular embodiment shown and described by way of illustration are in no way intended to be considered limiting. Reference to the details of these embodiments is not intended to limit the scope of the claims which themselves recite only those features regarded as essential to the invention.

I claim:

1. An apparatus for implementing a shift left with signed overflow detection instruction that operates on a first binary number, wherein said first binary number comprises a fixed number of successive bits with a most significant bit and a plurality of lower significant bits, said apparatus comprising:

in a first of two parallel paths, a shift unit that produces a shifted value by shifting the first binary number left by an amount controlled by a second binary number value;

in a second of said two parallel paths, a plurality of successive two input exclusive-or gates, each having one of said lower significant bits connected as a first input, a next successively lower one of said lower significant bit connected as a second input, and an output connected to an input of an unsigned logarithm of most significant bit circuit; and an output of said logarithm of most significant bit circuit being connected to an overflow detection unit, said overflow detection unit comprising:

an adder that produces a sum by adding the logarithm of most significant bit circuit output to the second binary number value;

a comparator that compares the sum against a maximum value, said maximum value being a position of a most significant bit of the shifted value; and an output that is active when the sum is greater than or equal to the maximum value.

2. An apparatus for implementing a shift left with unsigned overflow detection that operates on a first binary number, wherein said first binary number comprises a fixed number of successive bits with a most significant bit and a plurality of lower significant bits, said apparatus comprising:

in a first of two parallel paths, a shift unit that produces a shifted value by shifting the first binary number left by an amount controlled by a second binary number value;

in a second of said two parallel paths, the first binary number being connected to an input of an unsigned logarithm of most significant bit circuit; and an output of said unsigned logarithm of most significant bit circuit being connected to an overflow detection unit, said overflow detection unit comprising:

an adder that produces a sum by adding the unsigned logarithm of most significant bit circuit output to the second binary number value; and a comparator that compares the sum against a maximum value, said maximum value being a position of a most significant bit of the shifted value; and an output that is active when the sum is greater than the maximum value.

* * * * *